(12) United States Patent
Sasaki et al.

(10) Patent No.: US 12,094,189 B2
(45) Date of Patent: Sep. 17, 2024

(54) LEARNING METHOD, LEARNING PROGRAM, AND LEARNING DEVICE TO ACCURATELY IDENTIFY SUB-OBJECTS OF AN OBJECT INCLUDED IN AN IMAGE

(71) Applicant: NIPPON TELEGRAPH AND TELEPHONE CORPORATION, Tokyo (JP)

(72) Inventors: Taku Sasaki, Musashino (JP); Keita Mikami, Musashino (JP); Masashi Toyama, Musashino (JP); Kunihiro Moriga, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 437 days.

(21) Appl. No.: 17/608,154

(22) PCT Filed: May 13, 2019

(86) PCT No.: PCT/JP2019/018980
§ 371 (c)(1),
(2) Date: Nov. 2, 2021

(87) PCT Pub. No.: WO2020/230244
PCT Pub. Date: Nov. 19, 2020

(65) Prior Publication Data
US 2022/0222928 A1    Jul. 14, 2022

(51) Int. Cl.
*G06V 40/10*    (2022.01)
*G06V 10/22*    (2022.01)
(Continued)

(52) U.S. Cl.
CPC ............ *G06V 10/778* (2022.01); *G06V 10/22* (2022.01); *G06V 10/40* (2022.01); *G06V 10/82* (2022.01); *G06V 40/10* (2022.01)

(58) Field of Classification Search
None
See application file for complete search history.

(56) References Cited

U.S. PATENT DOCUMENTS 10,664,515 B2 * 5/2020 Sacheti ................. G06T 1/0007
2018/0122098 A1 5/2018 Wang et al.
(Continued)

FOREIGN PATENT DOCUMENTS

| CN | 108109055 A | * | 6/2018 | ............. G06F 16/00 |
| CN | 108229492 A | | 6/2018 | |
| WO | WO-2017203262 A2 | * | 11/2017 | ........... G06F 16/535 |

OTHER PUBLICATIONS

Li et al., "Harmonious Attention Network for Person Re-Identification", Retrieved from the Internet: https://arxiv.org/abs/1802.08122, Feb. 22, 2018, 10 pages.

*Primary Examiner* — Idowu O Osifade
(74) *Attorney, Agent, or Firm* — XSENSUS LLP

(57) ABSTRACT

A learning device allocates which feature value of a sub-object is extracted by a module from a group of sub-objects constituting an object of an image to each of modules that extract feature values of the object in the image in a deep neural network that is a learning target. After that, the learning device performs first learning to perform learning of the respective modules so that the respective modules are capable of precisely picking up regions of sub-objects allocated to the modules using information indicating the regions of the sub-objects in an image for each of images and second learning to perform learning of the respective modules so that analysis precision of an image analysis is further improved using a result of the image analysis based on the feature values of the sub-objects picked up by the respective modules.

20 Claims, 11 Drawing Sheets

(51) Int. Cl.
    *G06V 10/40*     (2022.01)
    *G06V 10/778*     (2022.01)
    *G06V 10/82*     (2022.01)

(56) References Cited

U.S. PATENT DOCUMENTS

| | | | |
|---|---|---|---|
| 2018/0137642 A1* | 5/2018 | Malisiewicz | G06V 20/64 |
| 2021/0142097 A1* | 5/2021 | Zheng | G06V 10/255 |

* cited by examiner

LEARNING METHOD, LEARNING PROGRAM, AND LEARNING DEVICE TO ACCURATELY IDENTIFY SUB-OBJECTS OF AN OBJECT INCLUDED IN AN IMAGE

CROSS-REFERENCE TO RELATED APPLICATION

The present application is based on PCT filing PCT/JP2019/018980, filed May 13, 2019, the entire contents of which are incorporated herein by reference.

TECHNICAL FIELD

The present invention relates to a learning method, a learning program, and a learning device.

BACKGROUND ART

Conventionally, there has been a technology to a cut out a portion in which an object (for example, a person) is reflected from an image to be analyzed, extract feature values of the cut-out portion, and analyze the cut-out portion on the basis of the extracted feature values in an image analysis. Here, when the image analysis is performed by deep learning, the use of a model having a so-called attention mechanism (attention model) in the above step of extracting the feature values of the object is proposed (see NPL 1).

The attention model is a model that pays attention to some regions included in a cut-out image and extracts a feature value for each of the notice regions. For example, when an object is a person, the attention model picks up the regions of sub-objects such as a head, an upper body, and a lower body from a cut-out image and extracts a feature value for each of the picked-up regions. By extracting a feature value for each of notice regions like this, the attention model can improve analysis precision when analyzing a cut-out portion.

Here, a HA-CNN (Harmonious Attention Convolutional Neural Network, see NPL 1) has been known as one of attention models. A feature value extraction module in the HA-CNN includes one global branch and a plurality of local branches. Each of the local branches picks up a partial region of an object (a region of a sub-object) from the above cut-out image and extracts the feature value of the picked-up region. Then, an analysis module (for example, a classification module and an attribute estimation module for an image object) analyzes the object on the basis of the feature values of the regions of the extracted respective sub-objects (see FIG. 1).

Here, the learning of the feature value extraction module of the HA-CNN is performed in such a manner that the weight parameters of the feature value extraction module are updated on the basis of errors back-propagated from a module (for example, an analysis module) subsequent to the feature value extraction module.

For example, a case in which the analysis module of a HA-CNN includes a classification module and an attribute estimation module for an image object as shown in FIG. 2 will be taken into consideration. In this case, the weight parameters of the respective local branches of a feature value extraction module are updated on the basis of errors back-proparagated from the classification module and the attribute estimation module. Thus, the respective local branches of the feature value extraction module are optimized so as to improve analysis precision by the analysis module. For example, the regions of sub-objects that are borne by the respective local branches are updated so as to improve the analysis precision by the analysis module. The above learning will be called the indirect review of the feature value extraction module for the purpose of illustration.

CITATION LIST

Non Patent Literature

[NPL 1] Wei Li et al., Harmonious Attention Network for Person Re-identification, CVPR2018 (arXiv:1802.08122), [Searched on Apr. 19, 2019], Internet <URL:https://arxiv.org/abs/1802.08122>

SUMMARY OF THE INVENTION

Technical Problem

Here, when an image object handled by the above HA-CNN is a person, each of cut-out images is such an image in which the whole body of the person is reflected and the person stands erect and only a case in which sub-objects (for example, a head, an upper body, a lower body, and the like) are arranged in the same order is assumed. Accordingly, as for an image in which the whole body of a person is reflected and stands erect, the feature value extraction module learned by the above cut-out images can exactly pick up each of the regions of the sub-objects of the person. As a result, image analysis precision by the analysis module is high.

Here, the above cut-out images are often imperfect (for example, only a part of an object is reflected, the order of sub-objects is different between the images, or the like). In such a case, the feature value extraction module may not exactly pick up the regions of the respective sub-objects. As a result, there is a problem that the image analysis precision by the analysis module is reduced.

The problem will be specifically described using FIG. 3. For example, when a cut-out image handled by the HA-CNN is an image in which the whole body of a person is reflected and the person stands erect as denoted by symbol 101, a first local branch and a second local branch of the feature value extraction module pick up the upper body and the lower body of the person, respectively, from the image denoted by symbol 101.

On the other hand, when a cut-out image handled by the HA-CNN is an image in which only the lower body of a person is reflected as denoted by symbol 102, the first local branch and the second local branch of the feature value extraction module pick up the portion of the pants of the person and the below-knee portion of the person, respectively, from the image denoted by symbol 102. That is, when a cut-out image is imperfect, the feature value extraction module of the HA-CNN cannot exactly pick up the regions (for example, the upper body and the lower body of a person) of respective sub-objects. As a result, there is a problem that the image analysis precision by the analysis module is reduced.

Accordingly, it is an object of the present invention to solve the above problem and improve image analysis precision even in a case in which a cut-out image is imperfect in an image analysis.

Means for Solving the Problem

In order to solve the above problem, the present invention provides a learning method performed by a learning device, the learning method including: a step of allocating which feature value of a sub-object is extracted by a module from a group of sub-objects constituting an object of an image to each of modules that extract feature values of the object in the image in a deep neural network that is a learning target; and a step of performing first learning to perform learning of the respective modules so that the respective modules are capable of precisely picking up regions of sub-objects allocated to the modules using information indicating the regions of the sub-objects in an image for each of images and second learning to perform learning of the respective modules so that analysis precision of an image analysis is further improved using a result of the image analysis based on the feature values of the sub-objects picked up by the respective modules.

Effects of the Invention

According to the present invention, image analysis precision can be improved even in a case in which a cut-out image is imperfect in an image analysis.

DESCRIPTION OF EMBODIMENTS

Hereinafter, a mode (embodiment) for carrying out the present invention will be described with reference to the drawings. The present invention is not limited to the present embodiment.

[Outline]

First, the outline of a learning device according to the present embodiment will be described using FIG. 4. Here, a learning target is a deep neural network that performs an image analysis. The deep neural network includes a cut-out module (not shown in FIG. 4) that cuts out a portion in which an object is reflected from an image to be analyzed, a feature value extraction module that extracts feature values of the cut-out portion, and an analysis module that analyzes the cut-out portion on the basis of the extracted feature values.

The feature value extraction module is constituted by a plurality of modules that extract feature values from an image. The modules are, for example, local branches used in a HA-CNN or the like. Hereinafter, a case in which the modules constituting the feature value extraction modules are the local branches will be described as an example. The feature value extraction module may include a global branch. Further, a case in which the analysis module includes a classification module that classifies an object reflected in an image and an attribute estimation module that estimates the attribute of the object will be described as an example.

The learning device allocates sub-objects borne by (that should be picked up by) the local branches to the respective local branches of the feature value extraction module. The sub-objects are objects constituting an object.

For example, when an object is a person, the sub-objects of the object are an upper body, a lower body, and the like. For example, the learning device allocates the upper body of a person as a sub-object borne by a local branch denoted by symbol 401 of FIG. 4 and allocates the lower body of the person as a sub-object borne by a local branch denoted by symbol 402 of FIG. 4.

After that, the learning device performs the learning of regions that should be picked up by the respective local branches of the feature value extraction module. For example, using information indicating regions in which sub-objects that should be picked up by the respective local branches exist (regions that should be picked up by the local branches) for each of cut-out images, the learning device performs the learning of the regions of the sub-objects that should be picked up by the respective local branches.

Figure 1:
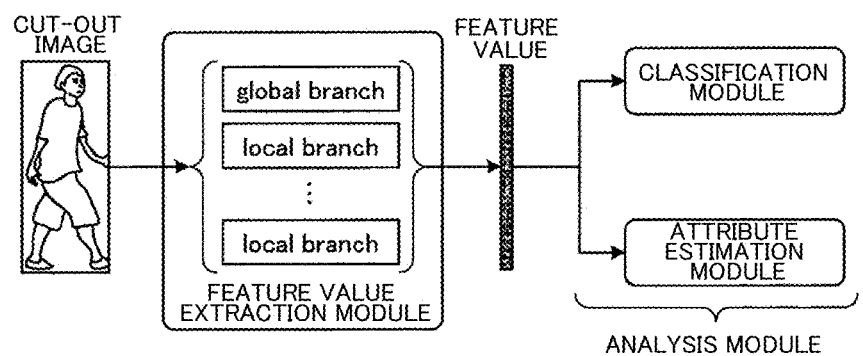
FIG. 1 is a diagram for illustrating a HA-CNN.
Figure 2:
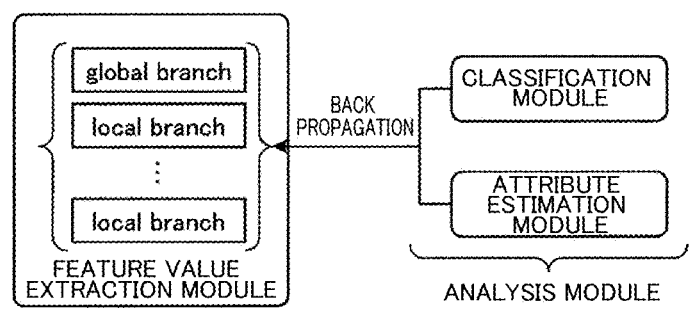
FIG. 2 is a diagram for illustrating the learning of a feature value extraction module in the HA-CNN.
Figure 3:
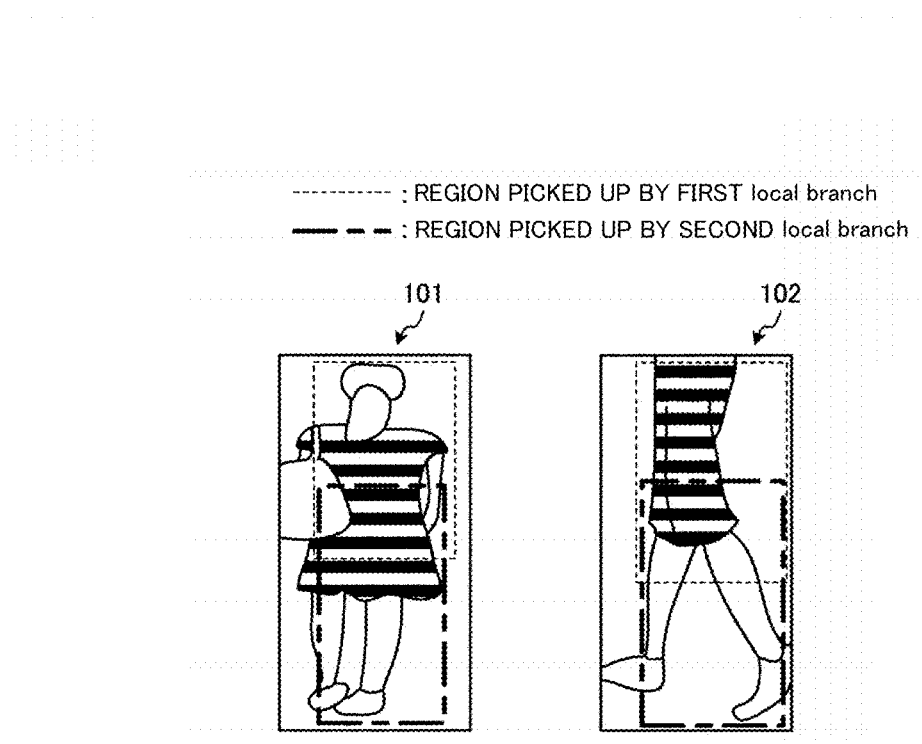
FIG. 3 is a diagram illustrating an example of extracting sub-objects in the HA-CNN.
Figure 4:
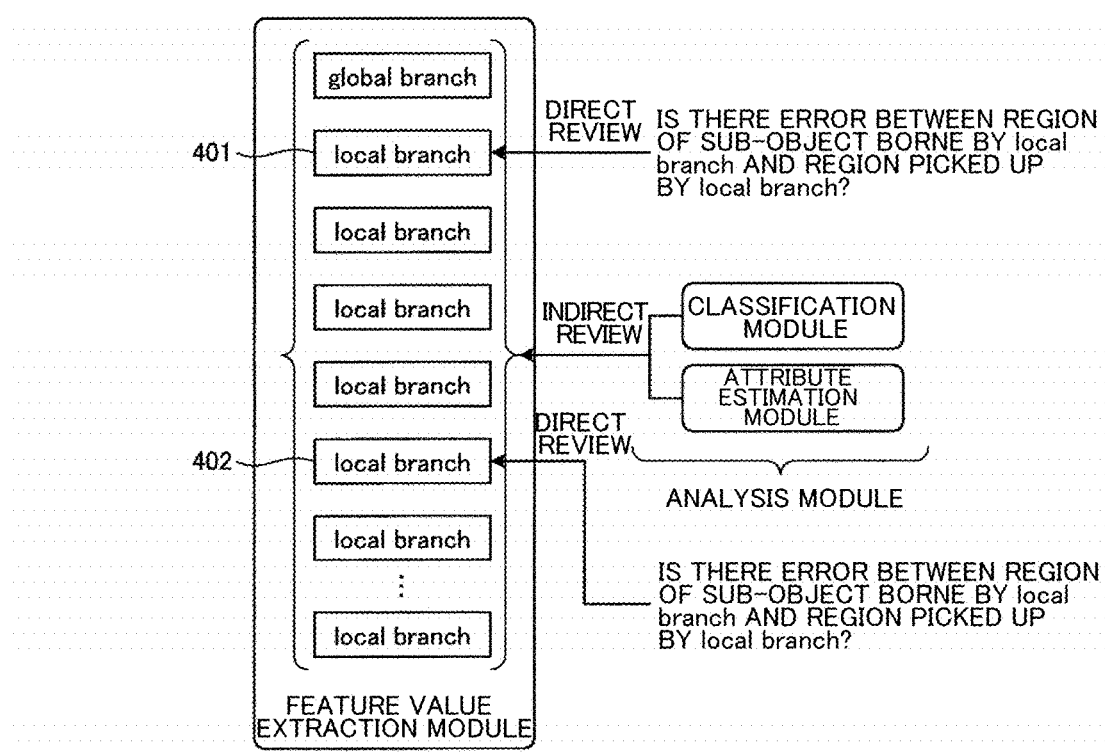
FIG. 4 is a diagram illustrating the outline of a learning device according to the present embodiment.

For example, when there is an error between the region of a sub-object borne by a local branch denoted by symbol 401 of FIG. 4 and a region picked up by the local branch, the learning device adjusts a parameter value of the local branch so as to reduce the error. Further, when there is an error between the region of a sub-object borne by a local branch denoted by symbol 402 of FIG. 4 and a region picked up by the local branch, the learning device adjusts a parameter value of the local branch so as to reduce the error. By repeatedly performing such an adjustment, the respective local branches can exactly pick up the regions of sub-objects allocated to the local branches themselves. Such an adjustment (learning) will be called the direct review of the feature value extraction module for the purpose of illustration. Further, in order to improve analysis precision by the analysis module, the learning device also performs learning as to which regions should be picked up by the respective local branches (that is, the learning device also performs the indirect review described above).

As described above, the learning device employs the direct review in addition to the above indirect review to perform the learning of the feature value extraction module. Therefore, compared with a case in which the learning is performed only by the above indirect review, the learning device can remarkably reduce the number of images or the number of epochs necessary for the learning.

[Configuration]

Figure 5:
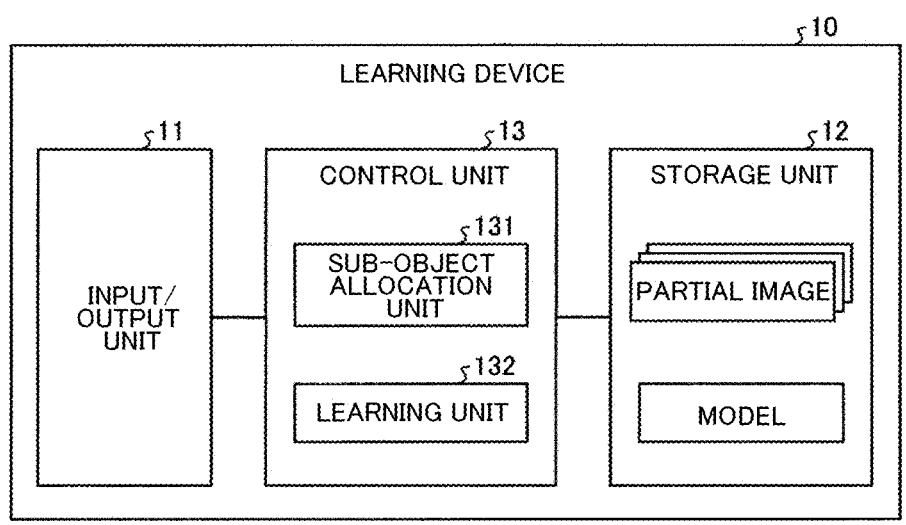
FIG. 5 is a diagram illustrating a configuration example of the learning device according to the present embodiment.

Next, a configuration example of the learning device will be described using FIG. 5. A learning device 10 includes an input/output unit 11, a storage unit 12, and a control unit 13.

The input/output unit 11 controls the input/output of various information. The input/output unit 11 receives, for example, the input of a partial image or the like to which the feature value extraction module refers.

The storage unit 12 stores various information referred to when the control unit 13 performs the above learning processing. For example, the storage unit 12 stores partial images input via the above input/output unit 11 and the model of a deep neural network obtained by the learning of the control unit 13. The model is, for example, information indicating the parameter values or the like of various modules (the cut-out module, the feature value extraction module, and the analysis module) used in the above deep neural network. The information of the model is appropriately updated by the learning processing of the control unit 13.

The above partial image is, for example, an image in which the information of a region in which a sub-object exists (that is, a region that should be picked up by a local branch) in an image is assigned for each image. The information (for example, coordinates) of the region in which the sub-object exists may be manually or automatically assigned.

For example, a case in which the learning device 10 determines to pick up two sub-objects of the upper body and the lower body of a person in the feature value extraction module and automatically assigns the information (for example, coordinates) of regions in which the sub-objects exist in an image will be taken into consideration.

Figure 6:
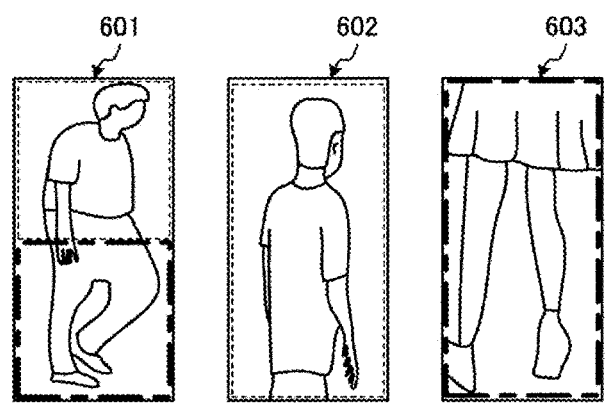
FIG. 6 is a diagram illustrating an example of automatically assigning the coordinates of sub-objects according to the present embodiment.

In this case, for example, the learning device 10 prepares in advance a cut-out image (see symbol 601 of FIG. 6) in which the whole body of the person is reflected, a cut-out image (see symbol 602 of FIG. 6) in which the upper body is reflected, and a cut-out image (see symbol 603 of FIG. 6) in which the lower body is reflected.

Figure 7:
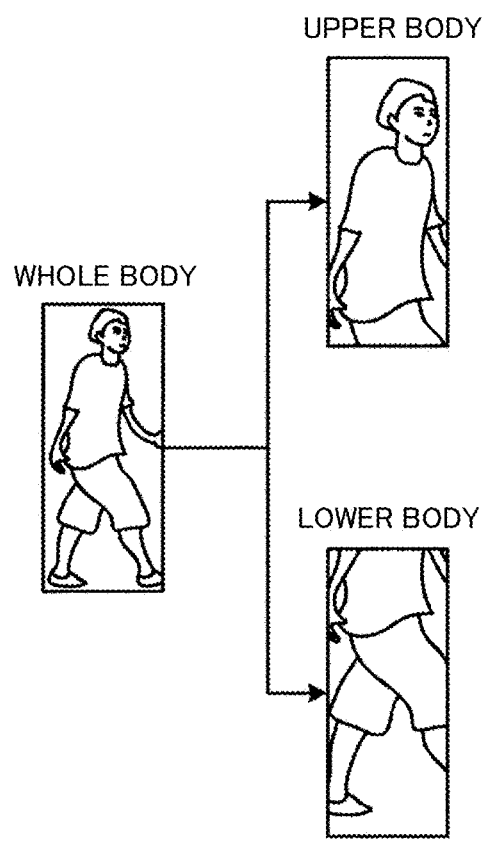
FIG. 7 is a diagram illustrating an example of a method for generating a cut-out image according to the present embodiment.
Figure 8:
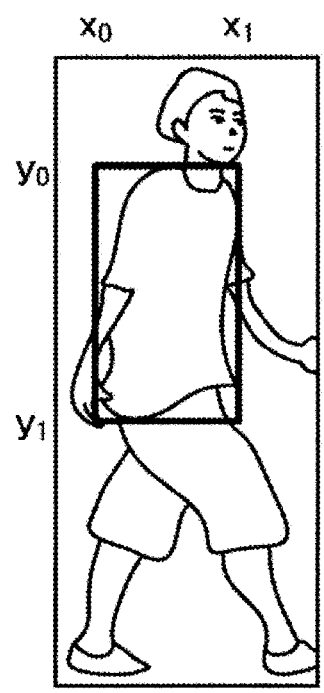
FIG. 8 is a diagram illustrating an example of a region picked up by a local branch according to the present embodiment.

Then, the learning device 10 determines that "the upper half of the cut-out image is the upper body and the lower half of the cut-out image is the lower body" with respect to the cut-out image in which the whole body of the person is reflected, determines that "the whole cut-out image is the upper body and the lower body does not exist" with respect to the cut-out image in which the upper body is reflected, and determines that "the whole cut-out image is the lower body and the upper body does not exist" with respect to the cut-out image in which the lower body is reflected. After that, on the basis of the above determination result, the learning device 10 assigns regions in which the upper body exists and regions in which the lower body exists in the respective cut-out images using, for example, the coordinates of the four sides of rectangular regions. Then, the learning device 10 stores the cut-out images, to which the coordinates of the regions in which the respective sub-objects exist are assigned, in the storage unit 12 as partial images. Note that the learning device 10 may divide a cut-out image in which the whole body is reflected into upper and lower images as shown in FIG. 7 when preparing a cut-out image in which an upper body is reflected and a cut-out image in which a lower body is reflected.

The description of FIG. 5 is given again. The control unit 13 includes a sub-object allocation unit 131 and a learning unit 132.

The sub-object allocation unit 131 allocates a sub-object borne by a local branch to each of local branches constituting the feature value extraction module. That is, the sub-object allocation unit 131 allocates which sub-object is picked up by a local branch from a group of sub-objects constituting an object to extract a feature value to each of the local branches. Here, the number and the type of the sub-objects picked up by the feature value extraction module may be any number and any type.

For example, assuming that the number of sub-objects picked up by the feature value extraction module is two when an object handled by a deep neural network is a person, the sub-object allocation unit 131 allocates the upper body of the person to a first local branch and allocates the lower body of the person to a second local branch. Further, assuming that the number of the sub-objects picked up by the feature value extraction module is two, the sub-object allocation unit 131 may similarly allocate the right side of the body of the person to the first local branch and allocate the left side of the body of the person to the second local branch.

In addition, assuming that the number of the sub-objects picked up by the feature value extraction module is three, the sub-object allocation unit 131 allocates the face of the person to the first local branch, allocates the upper body excluding the face of the person to the second local branch, and allocates the lower body of the person to a third local branch.

The learning unit 132 performs direct review (first learning) using partial images in addition to the above indirect review (second learning) with respect to the regions of sub-objects allocated to respective local branches by the sub-object allocation unit 131.

That is, using information indicating the regions of sub-objects in an image for each of images, the learning unit 132 performs the learning (first learning) of each of local branches so that the respective local branches can precisely pick up the regions of sub-objects allocated to the local branches. Further, using the result of an image analysis based on the feature values of the sub-objects picked up by the respective local branches, the learning unit 132 performs the learning (second learning) of each of the local branches so that the analysis precision of the image analysis is further improved.

Note that a loss function in a case in which the learning unit 132 performs the direct review (first learning) of the respective local branches is assumed to be, for example, the following one.

For example, a case in which the shape of regions picked up by the respective local branches is rectangle, the coordinates of a rectangular region actually picked up by the i-th local branch are $(x_0, x_1, y_0, y_1)$, and the coordinates of a rectangular region that should be picked up by the i-th local branch are given as follows will be taken into consideration.

$$(\hat{x}_0, \hat{x}_1, \hat{y}_0, \hat{y}_1) \qquad \text{[Math. 1]}$$

In this case, the learning unit 132 uses, for example, the following formula (1) as a loss function directly transmitted to the i-th local branch.

Formula (1)
$$(x_0 - \hat{x}_0)^2 + (x_1 - \hat{x}_1)^2 + (y_0 - \hat{y}_0)^2 + (y_1 - \hat{y}_1)^2 \qquad \text{[Math. 2]}$$

The learning unit 132 updates a model inside the storage unit 12 using the parameter values of the feature value extraction module that are obtained by the direct review and the indirect review.

[Processing Procedure]

Figure 9:
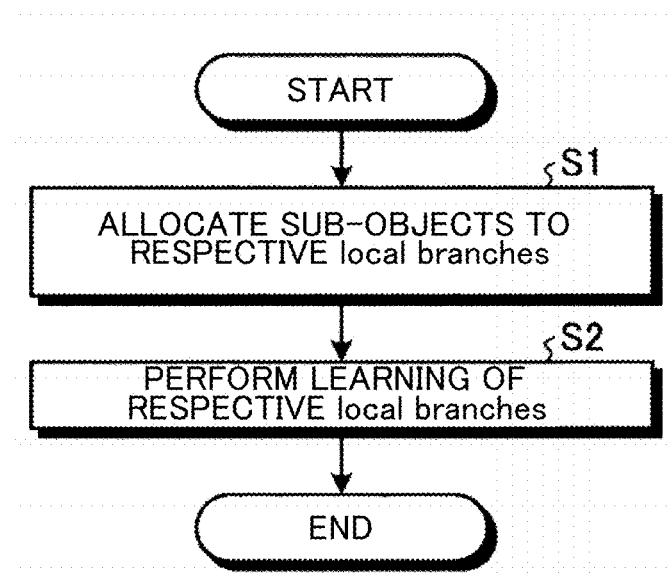
FIG. 9 is a diagram illustrating an example of the processing procedure of the learning device according to the present embodiment.

An example of the processing procedure of the above learning device 10 will be described using FIG. 9. First, the sub-object allocation unit 131 of the learning device 10 allocates sub-objects to respective local branches in the feature value extraction module of a deep neural network that is a learning target (S1). After that, the learning unit 132 performs the above learning of the respective local branches of the above feature value extraction module (S2). That is, the learning unit 132 performs the direct review of the respective local branches using partial images of the storage unit 12 in addition to the indirect review of the respective local branches using errors back-propagated from the analysis module.

[Effect]

The above learning device 10 assumes a region that should be picked up by each of the local branches of the feature value extraction module as a given one and regards the error as a loss function to also perform direct review. Thus, each of the local branches of the feature value extraction module can exactly pick up a desired portion (sub-object) of an object even for a cut-out image in which the object is imperfectly reflected. As a result, the feature value extraction module can precisely pick up the feature values of the respective sub-objects. Therefore, precision with which the analysis module performs the analysis (for example, classification, attribute estimation, identification, or the like) of the object can be improved.

For example, if the learning by the learning device 10 according to the present embodiment is applied to the learning of a deep neural network that performs the automatic analysis of a person reflected in an image with respect to the image photographed by a monitoring camera, even a "cut-out image in which only a part of a body is reflected" that has to be conventionally handled by visual recognition can also be automatically analyzed when there is a "request to search for a five-year-old lost girl dressed in red" or there is a "request to find out a criminal in the picture."

Figure 10:
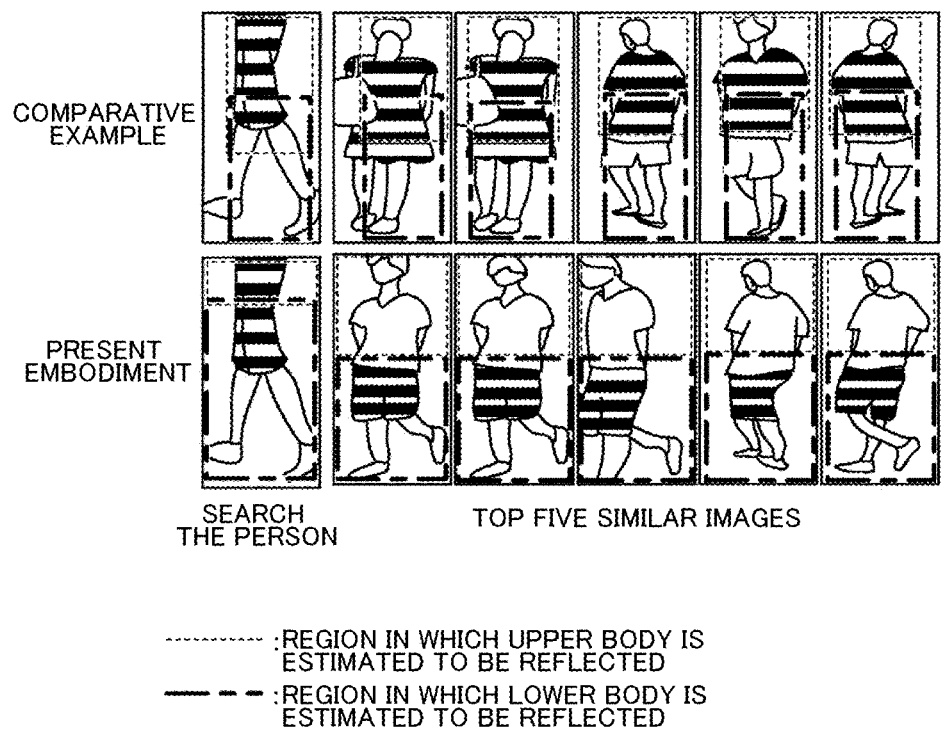
FIG. 10 is a diagram illustrating an example of an analysis result by a deep neural network learned by the learning device according to the present embodiment.

FIG. 10 shows the result of the comparison between a case in which the learning by the learning device 10 according to the present embodiment is applied to the learning of a deep neural network that performs an automatic person analysis with respect to an image photographed by a monitoring camera and a case in which the learning by the conventional technology (HA-CNN) is applied to the learning of the deep neural network.

Here, each of the deep neural networks was instructed to search for top five images that are similar to an image of a "person wearing border pants" (a person in an image indicated by "search for the person" on the left side of FIG. 10) from cut-out images.

In this case, a deep neural network learned by the conventional technology (HA-CNN) that is a comparative example should originally search for the image of the "person wearing border pants" but include an image of a "person wearing a border T-shirt" and an image of a "person wearing a border one-piece dress" in the above top five images. This is because only the lower body of the person is reflected in the cut-out image (the image indicated by "search for the person" of FIG. 10) of a comparison source and the deep neural network seems to fail the association between regions and portions on the image.

On the other hand, a deep neural network learned by the learning device 10 according to the present embodiment includes only the image of the "person wearing border pants" and does not include an image of a "person wearing a boarder T-shirt" or an image of a "person wearing a boarder one-piece dress" in the above top five images searched from the cut-out images. It appears from this fact that the deep neural network learned by the learning device 10 according to the present embodiment can precisely search for even an imperfect cut-out image.

That is, conventional technologies do not make a determination in advance as to which sub-objects should be borne by respective local branches in the feature value extraction module of a deep neural network. Therefore, the conventional technologies have to rely on an indirect review from a subsequent analysis module as to which sub-objects should be borne by the respective local branches. As a result, the preparation of a multiplicity of learning data or the preparation of a long learning time is required so that the respective local branches acquire learning to be capable of precisely extracting feature values even from imperfect cut-out images.

On the other hand, the learning device 10 according to the present embodiment makes a determination in advance as to which sub-objects should be borne by the respective local branches in the feature value extraction module. Thus, the learning device 10 can perform a direct review in addition to the above indirect review of the respective local branches. As a result, the respective local branches of the feature value extraction module can perform learning so as to be capable of precisely extracting feature values even from imperfect cut-out images using a practically-securable amount of learning data or a learning time.

[Program]

Further, a program that realizes the function of the learning device 10 described in the above embodiment can be mounted in a desired information processing apparatus (computer) by installation. For example, by performing the above program offered as package software or online software, an information processing apparatus can be caused to function as the learning device 10. The information processing apparatus mentioned here includes a desktop or notebook computer, a rack-mounted server computer, or the like. Besides, a mobile communication terminal such as a smart phone, a mobile phone, and a PHS (Personal Handyphone System), a PDA (Personal Digital Assistant), and the like fall under the category of the information processing apparatus. Further, the learning device 10 may be mounted in a cloud server.

Figure 11:
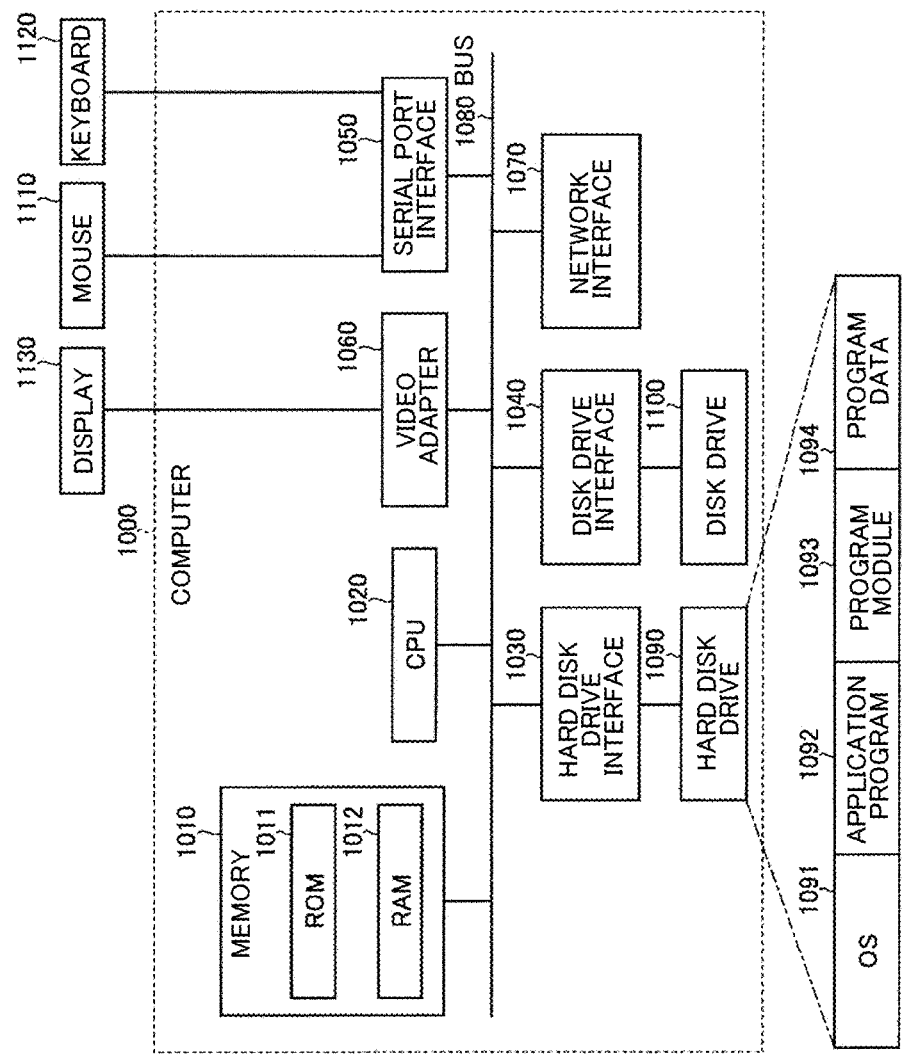
FIG. 11 is a diagram illustrating an example of a computer that performs a learning program according to the present embodiment.

An example of a computer that performs the above program (learning program) will be described using FIG. 11. As shown in FIG. 11, a computer 1000 has, for example, a memory 1010, a CPU 1020, a hard disk drive interface 1030, a disk drive interface 1040, a serial port interface 1050, a video adapter 1060, and a network interface 1070. The respective units are connected to one another via a bus 1080.

The memory 1010 includes a ROM (Read Only Memory) 1011 and a RAM (Random Access Memory) 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. In the disk drive 1100, a detachable storage medium such as a magnetic disk and an optical disk is, for example, inserted. The serial port interface 1050 is connected to, for example, a mouse 1110 and a keyboard 1120. The video adapter 1060 is connected to, for example, a display 1130.

Here, as shown in FIG. 11, the hard disk drive 1090 stores, for example, an OS 1091, an application program 1092, a program module 1093, and program data 1094. The various data or the information described in the above embodiment is stored in, for example, the hard disk drive 1090 or the memory 1010.

Then, the CPU 1020 reads the program module 1093 or the program data 1094 stored in the hard disk drive 1090 in the RAM 1012 if necessary to perform the respective procedures described above.

Note that the program module 1093 or the program data 1094 according to the above learning program is not necessarily stored in the hard disk drive 1090 but may be stored in, for example, a detachable storage medium and read by the CPU 1020 via the disk drive 1100 or the like. Alternatively, the program module 1093 or the program data 1094 according to the above program may be stored in other computers connected via a network such as a LAN and a WAN (Wide Area Network) and read by the CPU 1020 vis the network interface 1070.

REFERENCE SIGNS LIST

10 Learning device
11 Input/output unit
13 Control unit
12 Storage unit
131 Sub-object allocation unit
132 Learning unit

The invention claimed is:

1. A learning method performed by a learning device, the learning method comprising:
allocating a different sub-object of an object to each branch of a group of branches of a deep neural network, each branch being configured to extract a respective sub-object from a first image including the object; and
performing first learning to cause each branch to learn to identify regions of the respective sub-object allocated thereto using information indicating the regions of the sub-object in a second image including the sub-object; and
performing second learning to cause each branch to increase image analysis accuracy based on a result of image analysis based on the sub-objects identified in the first image by the group of branches after the first learning.

2. The learning method according to claim 1, wherein the second image used in the first learning includes only the sub-object, the sub-object being a part of the object included in the first image.

3. The learning method according to claim 1, wherein information indicating regions of sub-objects in the first image used in the first learning indicates regions to which the regions of the sub-objects belong among regions obtained by dividing the first image into rectangles.

4. The learning method according to claim 1, wherein information indicating regions of sub-objects in the second image used in the first learning is coordinate information of the sub-objects in the second image.

5. The learning method according to claim 1, wherein the deep neural network is a harmonious attention convolutional neural network (HA-CNN).

6. The learning method according to claim 5, wherein the object is a person and the sub-objects are parts of the person.

7. The learning method according to claim 6, wherein the parts of the person include an upper body, a lower body, and an arm.

8. The learning method according to claim 7, wherein at least one sub-object is selected based on a user query.

9. The learning method according to claim 8, wherein the user query is based on at least an article of clothing.

10. The learning method according to claim 4, wherein the coordinate information includes coordinates of a rectangle given by $\hat{x}_0, \hat{x}_1, \hat{y}_0, \hat{y}_1$.

11. The learning method according to claim 10, wherein the second learning is performed using a loss function given by:

$$(x_0-\hat{x}_0)^2+(x_1-\hat{x}_1)^2+(y_0-\hat{y}_0)^2+(y_1-\hat{y}_1)^2$$

wherein $x_0, x_1, y_0, y_1$ are coordinates of a rectangular region identified by the group of branches in the first learning.

12. A non-transitory computer readable medium storing a learning program which causes a computer to perform a method comprising:
allocating a different sub-object of an object to each branch of a group of branches of a deep neural network, each branch being configured to extract a respective sub-object from a first image including the object; and
performing first learning to cause each branch to learn to identify regions of the respective sub-object allocated thereto using information indicating the regions of the sub-object in a second image including the sub-object; and
performing second learning to cause each branch to increase image analysis accuracy based on a result of image analysis based on the sub-objects identified in the first image by the group of branches after the first learning.

13. The non-transitory computer readable medium according to claim 12, wherein the deep neural network is a harmonious attention convolutional neural network (HA-CNN).

14. The non-transitory computer readable medium according to claim 13, wherein the object is a person and the sub-objects are parts of the person.

15. The non-transitory computer readable medium according to claim 14, wherein the parts of the person include an upper body, a lower body, and an arm.

16. The non-transitory computer readable medium according to claim 15, wherein at least one sub-object is selected based on a user query.

17. The non-transitory computer readable medium according to claim 16, wherein the user query is based on at least an article of clothing.

18. The non-transitory computer readable medium according to claim 17, wherein
information indicating regions of sub-objects in the second image used in the first learning is coordinate information of the sub-objects in the second image, and the coordinate information includes coordinates of a rectangle given by $\hat{x}_0, \hat{x}_1, \hat{y}_0, \hat{y}_1$.

19. The non-transitory computer readable medium according to claim 18, wherein the second learning is performed using a loss function given by:

$$(x_0-\hat{x}_0)^2+(x_1-\hat{x}_1)^2+(y_0-\hat{y}_0)^2+(y_1-\hat{y}_1)^2$$

wherein $x_0, x_1, y_0, y_1$ are coordinates of a rectangular region identified by the group of branches in the first learning.

20. A learning device, comprising:
sub-object allocation circuitry that allocates a different sub-object of an object to each branch of a deep neural network, each branch being configured to extract a respective sub-object from a first image including the object; and
learning circuitry that:

performs first learning to cause each branch to learn to identify regions of the respective sub-object allocated thereto using information indicating the regions of the sub-object in a second image including the sub-object; and performs second learning to cause each branch to increase image analysis accuracy based on a result of image analysis based on the sub-objects identified in the first image by the group of branches after the first learning.

* * * * *